W. V. SEIFERT.
ANTIFRICTION JOURNAL BEARING.
APPLICATION FILED DEC. 19, 1908.
934,021.
Patented Sept. 14, 1909.
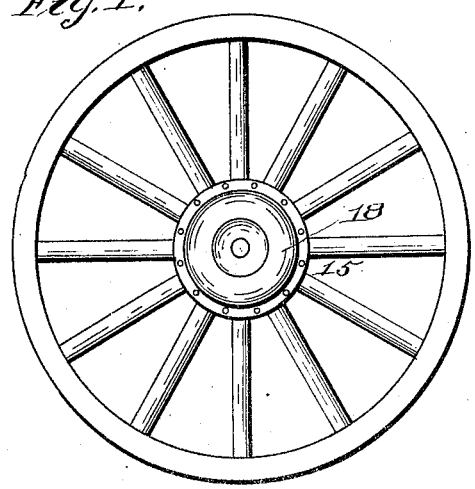
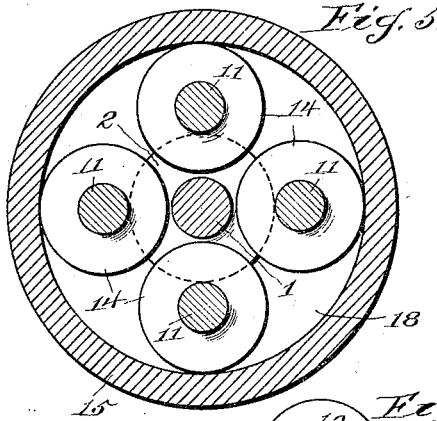
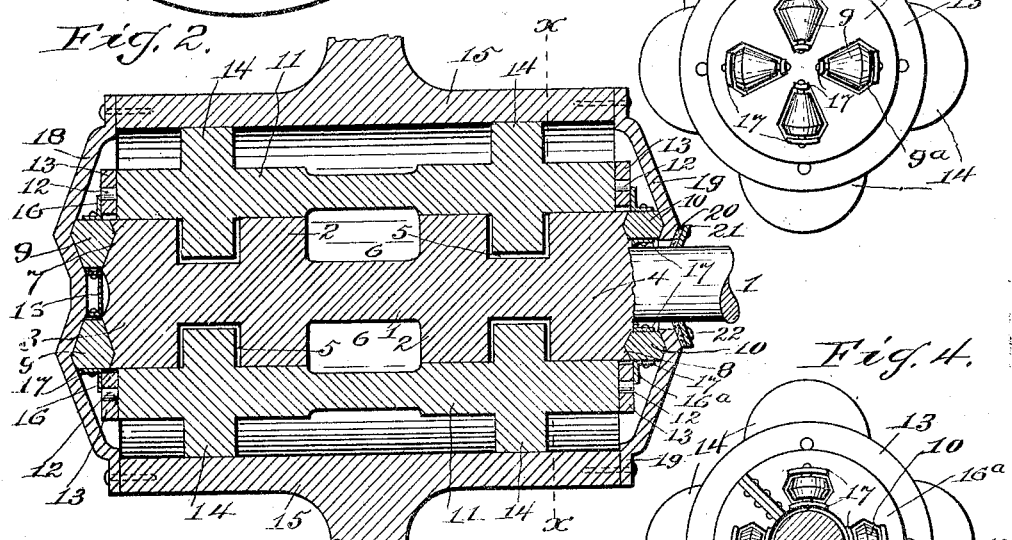
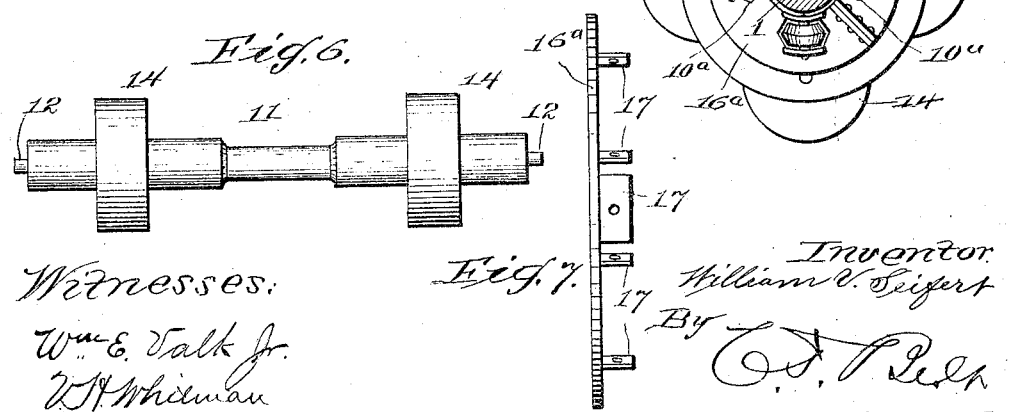

UNITED STATES PATENT OFFICE.

WILLIAM V. SEIFERT, OF CLAY CENTER, KANSAS.

ANTIFRICTION JOURNAL-BEARING.

934,021.

Specification of Letters Patent. Patented Sept. 14, 1909.

Application filed December 19, 1908. Serial No. 468,335.

*To all whom it may concern:*

Be it known that I, WILLIAM V. SEIFERT, a citizen of the United States, residing at Clay Center, in the county of Clay and State of Kansas, have invented certain new and useful Improvements in Antifrictional Journal-Bearings, of which the following is a specification.

This invention relates to axle bearings and pertains especially to roller bearing axles or spindles.

The object of the invention is to provide certain improvements in roller bearings for axles or spindles applicable to various machinery, vehicles and other articles and devices having journals, rotary bearings, spindles, axles or hubs.

A further object of the invention is to provide in a roller bearing certain novel and peculiar construction and arrangement of such rollers with relation to an axle or spindle, whereby a more evenly balanced and uniform bearing is produced.

A still further object of the invention is to provide in a roller bearing, novel and peculiar means for holding such rollers in revoluble position on an axle, spindle or shaft.

A still further object of the invention is to provide a fixed shaft, axle or spindle with a series of roller bearings having journal bearings loose upon the axle ends, said rollers having certain portions revolved against portions of the axle, and certain portions revolved against portions of the hub of the wheel revolved on said axle.

A still further object of the invention is to provide a circular series of rollers for an axle and its wheel hub arranged to revolve on their own axes in loose bearings at the ends of the axle and in contact with the said axle and the said wheel hub during the revolution of the latter, and to provide thrust rollers rotated by said hub against the ends of the said axle.

Other objects, advantages and improved results are attainable by and through the construction and arrangement which will be particularly described in the specification and set forth in the claims to hereinafter follow.

In the accompanying drawings forming part of this application: Figure 1 is an end view of an axle and wheel hub embodying the invention. Fig. 2 is a longitudinal sectional view. Fig. 3 is an elevation of the outer end of the axle with its cap removed. Fig. 4 is a similar view of the other or inner end of the axle. Fig. 5 is a cross section on the plane indicated by the dotted line x—x, Fig. 2. Fig. 6 is a detail elevation of one of the longitudinal rollers. Fig. 7 is a detail edge view of one of the cone carrying plates.

The same reference numerals denote the same parts throughout the several views of the drawings.

The invention is applicable to various other axles, spindles, shafts and journals, as hereinbefore stated, but for the purpose of exemplification and illustration it is shown applied to a non-revoluble vehicle spindle or axle spindle 1. The axle 1 is specially constructed, having a pair of circular bearings 2, and circular end bearings 3 and 4, with a space 5 between each of the bearings 2 and their adjacent end bearings 3 and 4, and a central space 6 between the bearings 2. The face ends of the spindle have angular bearing surfaces 7 and 8 for double cone shaped rollers 9 and 10, hereinafter to be particularly described.

A circular series of longitudinal rollers 11 surround the axle, each of such rollers having end pintles 12 journaled in rings 13 loose upon the ends of the axle, and each roller has a pair of circular bearing flanges 14 made in the same piece therewith and bearing against the wheel hub 15. The circular flanges 14 are revolved in the spaces 5 without contact with the axle, while the portions of the rollers adjacent each side of the flanges revolve against the axle bearings 2, 3 and 4, so that the portions of the rollers which engage the axle do not engage the wheel hub.

Upon the outer side of the roller-bearing ring 13 are circular plates 16 and 16ª, having openings 9ª and 10ª respectively, and lugs 17 in which the double cone-shaped rollers 9 and 10 are journaled. The rollers 9 revolve in the openings 9ª against the angular end surface 7 of one end of the axle, and the rollers 10 revolve in the openings 10ª against the angular surface 8 of the other or inner end of the axle. The rollers 9 and 10, rings 13, plate 16 and plate 16ª are held in proper position within the hub by caps 18 and 19 which are secured to the ends of the hub and have bearings for the cones like those of the axle ends. The plate 16ª is split or divided in two sections for clamping around the inner end of the axle, and the cap 19 has a central opening for the axle. The cap 19 is provided with a dust-proof ring 20 of felt or other suitable material which is held upon the axle by a two-part ring 21 secured to the cap 19 by suitable screws 22.

It will be observed that the caps 18 and 19 constitute the only means for holding within the wheel hub all the elements in operative position relative to each other and to the wheel hub; that none of such elements is fixed (except as to lengthwise movement) either to the axle or to the hub; that the cones and the caps prevent lengthwise movement of the rollers during their revolution; and that all elements within the hub (except the axle) are free to be revolved according to the movement of the wheel.

It is obvious that in such construction and arrangement of the parts as here presented, there is no frictional contact between the parts, that the relative bearing of such parts is always the same regardless of the weight on or of the movement of the wheel, and that in consequence thereof the usual friction and wear on such parts is obviated without oiling them.

Having thus described my invention what I claim as new and desire to secure by Letters Patent is:

1. In a journal bearing, the combination, with a suitable hub, an axle spindle having angular end faces, a series of longitudinal rollers, and hub-caps having angular bearing faces opposite the spindle faces, of a series of cone rollers working between the cap faces and the spindle faces, a pair of rings in which the longitudinal rollers are journaled, and a pair of circular plates in which the cone rollers are journaled, said plates overlapping the rings to prevent longitudinal movement of the longitudinal rollers.

2. In a journal bearing, the combination, with a suitable hub, an axle spindle having roller bearing end faces, a series of longitudinal rollers, hub-caps having like bearing faces, and a series of cone-shaped rollers engaging the spindle faces and the cap faces, of means for journaling both series of rollers comprising a pair of rings in which the longitudinal rollers are journaled, and a pair of circular plates having openings in which the cone rollers revolve and projecting lugs in which the cone rollers are journaled, said plates extending over the rings to prevent longitudinal movement of the rings and the longitudinal rollers.

3. In a journal bearing, the combination, with a suitable hub or casing, an axle spindle spaced with bearings and having angular end face bearings, and hub-caps having bearings like the spindle faces and opposite the latter, of a series of longitudinal rollers having flanges engaging the hub and working in said spindle spaces free of the spindle, a series of cone rollers between the cap-faces and the spindle-faces, a pair of rings in which the longitudinal rollers are journaled, and a pair of circular plates in which the cones are journaled, said rings and plates adapted to revolve around the axle and co-acting to prevent longitudinal movement of the rings and the longitudinal rollers.

In witness whereof I hereunto set my hand in the presence of two witnesses.

WILLIAM V. SEIFERT.

Witnesses:
AUGUST BERGER,
GUS J. OBENLAND.